(12) United States Patent
Robinson et al.

(10) Patent No.: US 6,892,581 B2
(45) Date of Patent: *May 17, 2005

(54) MULTI-AXIS VIBRATION SENSOR WITH INTEGRAL MAGNET

(75) Inventors: James C. Robinson, Knoxville, TN (US); Kenneth R. Piety, Knoxville, TN (US); Bradley D. Pardue, Blaine, TN (US)

(73) Assignee: CSI Technology, Inc., Wilmington, DE (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/461,984

(22) Filed: Jun. 16, 2003

(65) Prior Publication Data

US 2004/0139803 A1 Jul. 22, 2004

Related U.S. Application Data

(63) Continuation-in-part of application No. 09/988,926, filed on Nov. 19, 2001, now Pat. No. 6,598,479.

(51) Int. Cl.[7] .............................................. G01H 11/06
(52) U.S. Cl. ........................................................ 73/658
(58) Field of Search .......................... 73/587, 593, 658, 73/659, 660

(56) References Cited

U.S. PATENT DOCUMENTS

| 4,237,454 | A | 12/1980 | Meyer .......................... 340/682 |
| 4,483,180 | A | 11/1984 | Ohbuchi et al. ........... 73/35.03 |
| 4,771,637 | A | 9/1988 | Kubler .......................... 73/493 |
| 4,885,707 | A | * 12/1989 | Nichol et al. ................. 702/56 |
| 5,379,643 | A | 1/1995 | Taylor .......................... 73/654 |
| 5,546,809 | A | 8/1996 | Cotton ......................... 73/644 |
| 5,646,340 | A | 7/1997 | Gee et al. ..................... 73/116 |
| 5,854,994 | A | 12/1998 | Canada et al. ................ 702/56 |
| 5,907,491 | A | 5/1999 | Canada et al. ............. 700/108 |
| 5,945,603 | A | 8/1999 | Shih ............................ 73/652 |
| 6,213,442 | B1 | 4/2001 | Ivers et al. ................. 248/556 |
| 6,598,479 | B1 | * 7/2003 | Robinson et al. ............ 73/658 |
| 2004/0050163 | A1 | * 3/2004 | Komninos .................... 73/587 |

FOREIGN PATENT DOCUMENTS

| JP | 402008715 A | 1/1990 |
| JP | 402008716 A | 1/1990 |

* cited by examiner

Primary Examiner—Hezron Williams
Assistant Examiner—Rose M. Miller
(74) Attorney, Agent, or Firm—Luedeka, Neely & Graham, P.C.

(57) ABSTRACT

A multi-axis vibration sensor with integral magnet optimizes sensor response in a non-permanently attachable package. In a preferred embodiment of the invention, the apparatus includes a housing having a magnet, a multi-axis vibration sensor for sensing vibration along multiple machine axes, and conditioning circuitry disposed within the housing. The magnet enables the apparatus to be placed in sensory contact with the machine. The vibration sensor senses machine vibration along multiple machine axes when the apparatus is in sensory contact with the machine, and the conditioning circuitry optimizes the frequency response of the vibration sensor by reducing the gain of the sensor output at resonance. The vibration sensor may be mounted directly to existing machine structure, such as the machine's outer casing. Two parallel feet facilitate stable mounting of the sensor curved surface. A keyed mounting pad may be employed to facilitate proper orientation of the sensor.

33 Claims, 4 Drawing Sheets

MULTI-AXIS VIBRATION SENSOR WITH INTEGRAL MAGNET

This is a continuation-in-part of application Ser. No. 09/988,926 filed Nov. 19, 2001 and entitled "Integral Magnet Vibration Sensor", which issued as U.S. Pat. No. 6,598,479.

FIELD OF THE INVENTION

The present invention relates generally to vibration sensors. More particularly, the present invention relates to a multi-axis vibration sensor module having an integral magnet for attaching the vibration sensor to a machine.

BACKGROUND OF THE INVENTION

Industrial and manufacturing facilities typically employ large electrically powered machines to provide the horsepower and motive forces needed for production. Proper operation of such machines is often essential to meeting production needs. To this end, production facilities often adopt predictive maintenance programs in which machines are periodically monitored to ensure proper operation. Many predictive maintenance programs employ vibration analysis as a way to assess the health of the machine. During vibration analysis, a vibration sensor, or accelerometer, is positioned against the machine to be monitored and the accelerometer output is analyzed to detect the presence of anomalous operating conditions.

A variety of methods are used for maintaining contact between the accelerometer and the machine being monitored. For example, the accelerometer can be configured to be manually held against the machine as data is taken. Other methods allow for permanent attachment of the accelerometer to the machine (such as by threaded fastener or adhesive) to enable hands-free taking of data. However, such permanent mounting methods are less than desirable due to the labor and costs involved, and the use of attachment methods which do not permanently affix the accelerometer to the machine have historically proven to be disadvantageous as a result of poor sensor response.

During the data collection process, it is often desirable to collect machine vibration data in multiple directions or axes (e.g., radial, vertical and axial). Stress wave measurements should also be acquired in at least one of the directions. Traditional data collection techniques call for mounting a single-axis sensor to sense vibration along one axis, waiting for the sensor to settle, acquiring data, and then repeating these steps for all other axes for which data is needed. When collecting data along multiple axes, the process is time consuming, inefficient, and susceptible to error as the sensor must be precisely aligned along each axis to ensure accuracy and repeatability.

Multi-axis vibration sensors have been available for a few years, but they have not been generally accepted as an alternative to single axis sensors for portable condition monitoring. One reason for this is the difficulty in properly mounting a traditional multi-axis sensor to the machine. Each time the sensor is mounted it must be properly oriented in a plane tangent to the surface of the machine and it must be torqued down on a very clean, smooth surface to maintain adequate bandwidth. The efforts required to mount these sensors is generally seen as outweighing any savings gained by not having to multi-mount a single axis sensor.

What is needed, therefore, is the ability to efficiently obtain accurate vibration data along multiple machine axes employing a multi-axis vibration sensor.

SUMMARY OF THE INVENTION

The present invention eliminates the difficulties and disadvantages of the prior art by configuring a multi-axis vibration sensor to be placed in sensory contact with a machine. In accordance with a preferred embodiment of the invention, the inventive vibration sensor apparatus includes a housing having a first end and a second end. Disposed within the housing adjacent the first end and permanently built into or otherwise affixed thereto is a magnet for magnetically attaching the apparatus in a desired orientation to a mounting surface that transmits machine vibration. A multi-axis vibration sensor disposed within the housing adjacent the magnet senses vibration produced by the machine and outputs a plurality of sensor signals corresponding to the sensed vibration. The multi-axis vibration sensor, preferably a tri-axial sensor, is in rigid permanent relation to the magnet and electrically isolated therefrom. Also disposed within the housing is signal conditioning circuitry for conditioning the sensor signals. At the resonant frequency of the apparatus, the conditioned sensor signals preferably have a gain of less than 15 dB relative to the sensor's linear response range. A communication link adjacent the second end of the housing enables a peripheral device, such as a portable data collector, to access the sensor signals over a broad frequency band.

In accordance with one aspect of the preferred embodiment, the sensor signals are output by the vibration sensor module in the form of an electrical charge. In the conditioning circuit, a filter (such as a two-pole, low pass filter) attenuates the sensor module signals, thereby providing acceptable response at the resonant frequency. The filtered sensor signals produced by the conditioning circuit are in the form of an electrical charge. A converter receives the filtered sensor signals and converts them from an electrical charge to a corresponding voltage for use by the peripheral device.

The conditioning circuitry includes a two-pole, low-pass filter configured to provide a sensor bandwidth of 10 kHz within 3 dB for vibration sensing in the vertical direction and is configured to provide a bandwidth of 4 kHz within 3 dB for vibration sensing in the axial and radial directions.

To enhance the stability of the apparatus when being attached to an uneven mounting surface, a plurality of feet are rigidly attached to the first end of the housing so that both feet contact the mounting surface when the apparatus is placed in sensory contact with the machine. The feet are preferably elongate and substantially parallel to one another. The mounting surface to which the sensor is magnetically attached may be an existing machine structure such as the machine's outer casing. Alternatively, a keyed mounting pad may be employed to facilitate proper orientation of the sensor when placed in sensory contact with the machine.

BRIEF DESCRIPTION OF THE DRAWINGS

One or more preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

Figure 1:
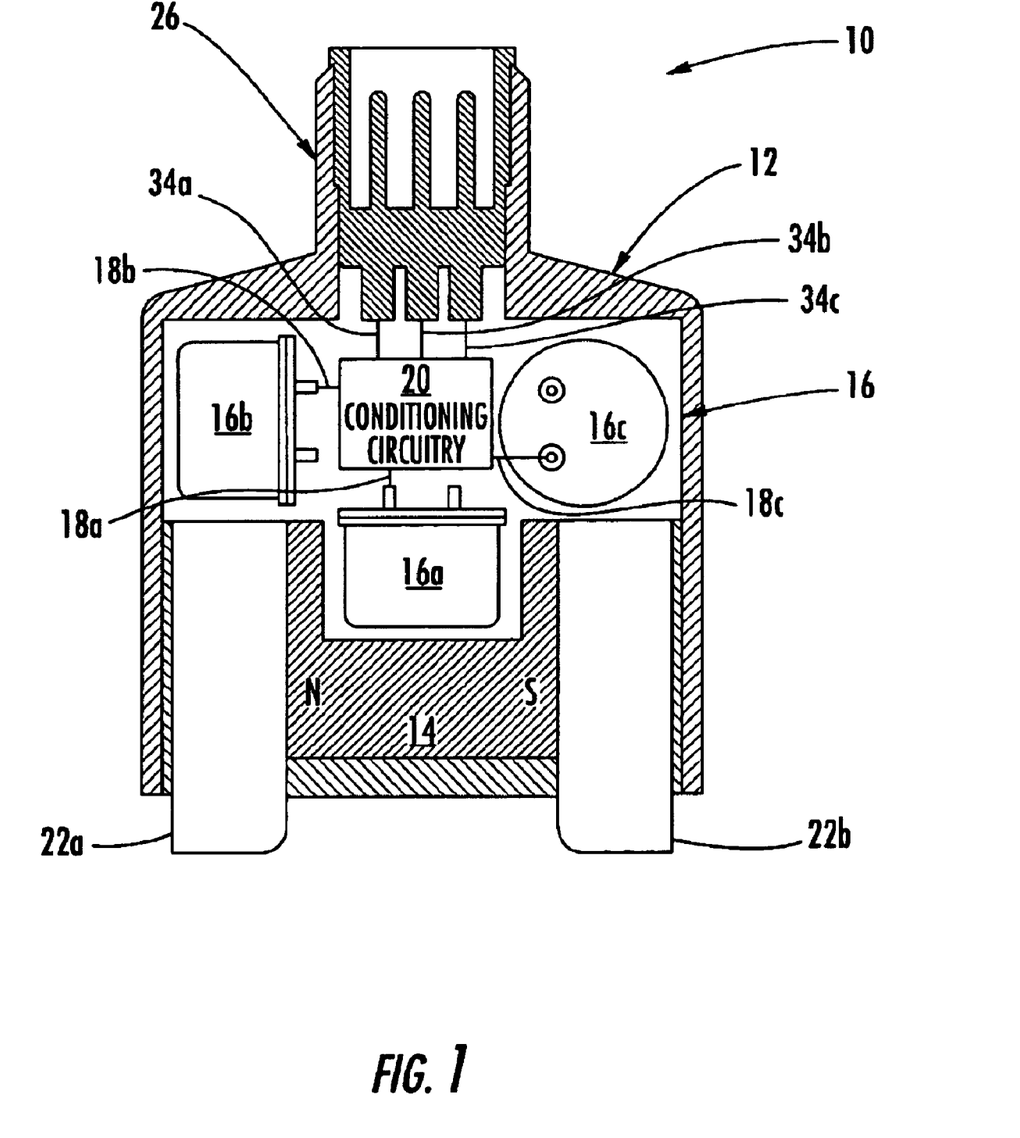
FIG. 1 is a cross-section view of an integral magnet vibration sensor in accordance with the invention.

With reference now to the drawings in which like reference characters designate like or similar parts throughout the several views, FIG. 1 provides a cross-section view of a preferred embodiment of an integral magnet multi-axis accelerometer sensor in accordance with the invention. In the preferred embodiment shown in FIG. 1, the integral sensor 10 is placed in sensory contact with a machine by magnetically attaching the sensor 10 in a desired orientation to a mounting surface that transmits vibration produced by the machine. Preferably, the sensor 10 includes a housing and a magnet assembly including a magnet 14 used for removably attaching the sensor 10 to the mounting surface. The magnet 14 is preferably a permanent magnet fabricated from a neodymium compound (such as NdFeB) with a north pole (N) and a south pole (S) as shown. A plurality of vibration sensor modules 16a, 16b, and 16c (which collectively may be characterized as a multi-axis vibration sensor with a plurality of sensor outputs) are preferably positioned adjacent the magnet 14 in alignment with their respective axes. For example, module 16a is in alignment with the central axis of the sensor 10, module 16b is in alignment with a plane that is parallel to a surface aligned perpendicular to the sensor's feet 22a, 22b, and module 16c is in alignment with a plane that is parallel to a surface that is aligned parallel to the sensor's feet 22a, 22b. In this configuration, the sensor 10 can be oriented to sense vibration in the vertical Z direction (i.e., in a plane parallel to a plane tangent to an outer surface of the machine), radial Y direction (i.e., in a direction normal to an outer surface of the machine), and axial X direction (i.e., in a direction parallel to a rotating shaft of the machine) directions. Another way to define these directions is to state that the Z direction is in a plane perpendicular to a radius a rotating machine shaft, the Y direction is on a radius of a rotating machine shaft, and the X direction is parallel to the axis of the rotating shaft.

Each vibration sensor module 16a–c is electrically isolated from the magnet 14 and may include any sensor type capable of sensing vibration and producing an output corresponding to sensed vibration. In a preferred embodiment, each vibration sensor module 16a–c includes a piezoelectric-type sensing element.

When the sensor 10 is attached to the mounting surface, vibration generated by the machine is transmitted through the mounting surface to the sensor 10 and sensed by the vibration sensor modules 16a–c which output signals on lines 18a, 18b, and 18c corresponding to the sensed vibration. As used herein, the term "line" is given broad construction and is used to refer to a single electrically conducting wire as well as a plurality of wires for conducting signals. Sensor response (i.e., the usable frequency range of the sensor) is improved by keeping the sensor 10 and its components as stiff as possible. Therefore, the vibration sensor module 16 and magnet 14 are preferably positioned within the sensor housing 12 in rigid relation to one another. Sensor response is also improved by minimizing the sensor's mass or weight and by positioning the vibration sensor module 16 adjacent the magnet 14. The magnet 14 and vibration sensor module 16 can be positioned within the housing 12 by any acceptable means of attachment. In a preferred embodiment, the magnet 14 and vibration sensor module 16 are potted into the housing 12 with an epoxy with the magnetic poles (N, S) of the magnet aligned substantially parallel to the machine surface onto which the sensor 10 is attached.

Many machines which the sensor 10 may be used to monitor have uneven surfaces onto which the sensor 10 may be attached. For example, the outer casing of most electric motors are rounded. To enhance the stability of the sensor 10 and prevent it from moving when attached to an uneven machine surface, the sensor 10 is preferably provided with feet 22a, 22b. Each of the feet 22a, 22b are fabricated from a magnetically attractable material and positioned adjacent opposed ends of the magnet 14, as shown in FIG. 1, so that one foot (22a) is magnetic north and the other foot (22b) is magnetic south. To improve rigidity, the feet 22a, 22b are attached to the magnet 14, such as by an adhesive or welding. The feet 22a, 22b are preferably configured as elongate rails (see FIG. 6) which extend below the housing 12 and make contact with the machine to which the sensor 10 is attached.

Figure 2:
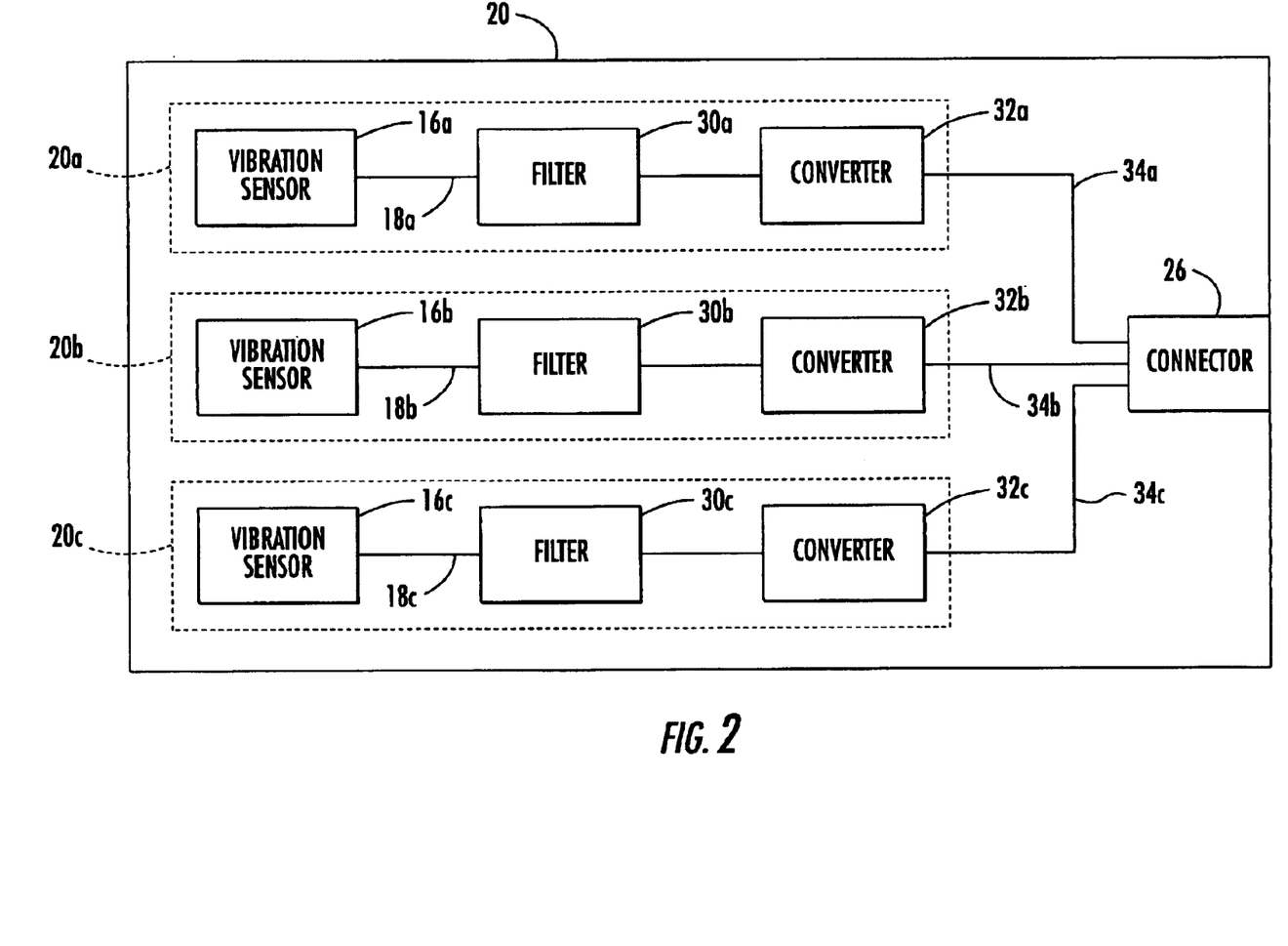
FIG. 2 is a functional block diagram of an integral magnet vibration sensor in accordance with the invention.

With reference to FIGS. 1 and 2, conditioning circuitry 20 is associated with the housing 12 and is preferably positioned within the housing 12 adjacent to the sensor modules 16a–c. The conditioning circuitry 20 may be configured to perform a desired conditioning of the sensor module outputs 18a–c, including amplifying, attenuating, filtering, or the like. In a preferred embodiment, the conditioning circuitry 20a–c is configured to attenuate each axis of vibration sensor output to improve the sensor's frequency response, as further discussed below. The conditioned sensor signals produced by the conditioning circuitry 20 are output on lines 34a–c and made available to a peripheral device, such as a portable data collector. Preferably, the data collector is a multi-channel data collector which takes advantage of the multi-axis vibration output of the sensor 10 and enables acceptable data to be collected in less time than a single channel data collector.

Typically, the desired data to be obtained from the sensor 10 will include normal vibration data in the X, Y and Z directions, and peak vibration data (such as that disclosed in U.S. Pat. No. 5,895,857, the entire contents of which is hereby expressly incorporated by reference) in the Z direction.

The sensor 10 may be configured to utilize any acceptable means for interfacing with the peripheral device. In a preferred embodiment, the upper end of the sensor housing 12 includes a threaded connector 26 which serves as an output/communication link to enable the peripheral device to securely connect with the sensor 10. Alternatively, a connector may be positioned radially on the outer surface of the sensor 10.

As shown in the functional block diagram of FIG. 2, the output of each vibration sensor module 16a–c is processed by the conditioning circuitry 20a–c and the conditioned sensor signals are made available to the peripheral device by way of the communication link at connector 26. As stated above, it is preferable that the conditioning circuitry 20a–c be advantageously disposed in the sensor housing 12 in close proximity to the vibration sensor modules 16a–c to reduce noise and improve the sensor's frequency response. As previously stated, the vibration sensor module 16a–c is preferably a piezoelectric-type transducer, which inherently produces a high impedance output. To maximize the usefulness of the sensor's output, it is converted to low impedance by conditioning circuitry 20a–c.

Processing the high impedance output of the vibration sensor module 16a–c in close proximity to the sensor module 16a–c significantly reduces the amount of noise and other losses which otherwise can be expected to degrade the vibration sensor output. Also, by placing the vibration sensor module 16a–c, conditioning circuitry 20a–c, and magnet 14 all in one housing 12, the frequency response of the overall sensor 10 is improved due to the low total mass, high stiffness and filtering incorporated in conditioning circuitry 20a–c.

By integrating the vibration sensor modules 16a–c and magnet 14, the parameters of the conditioning circuitry 20 can be optimized to obtain a desired sensor bandwidth. Preferably, the minimum sensor bandwidth for normal vibration (i.e., where a substantially linear response of the sensor 10 is observed) within ±3 dB is 5 KHz. The minimum sensor bandwidth for vibration peak data within ±3 dB is 10 KHz. Associating the conditioning circuitry 20 with the sensor housing 12 by placing it within the housing 12 also enables processing of the vibration sensor output to be optimized at all times within the sensor 10 itself, which in turn reduces inconsistency in data readings and enhances the vibration sensor's frequency response characteristics.

In a preferred embodiment, the conditioning circuitry 20a–c includes a filter 30a–c for each axis which reduces the level of electrical charge (i.e., attenuates the gain of the signal) that is output by the piezoelectric sensing element of the vibration sensor module 16a–c around resonant frequency of the sensor module 16a–c. If the sensor output is left unattenuated, it could quickly reach a runaway condition at resonance and saturate the electronics used to convert from high impedance to low impedance (converter 32a–c of FIG. 2). Such a "runaway" condition renders the sensor output useless. Thus, reducing the gain at resonance of the vibration sensor output increases the usable frequency range of the sensor output by lowering the vibration sensor signal to an acceptable level at the resonant frequency of the sensor 10. However, too much gain reduction has the undesirable effect of reducing the sensor's bandwidth. Therefore, in selecting the conditioning circuit parameters for attenuation of the sensor module output 18a–c, the object is to optimize sensitivity with gain reduction. The optimal parameters will largely depend on the overall mass and stiffness of the sensor 10 and sensor modules 16a–c.

To avoid excessive signal response over the entire bandwidth for which the sensor 10 responds, the conditioning circuitry 20 is preferably configured to attenuate or otherwise limit increase in sensor response at the sensor's resonant frequency to a level of no more than 15 dB relative to the substantially linear response region of the sensor modules 16a–c. The signal-to-noise ratio of the sensor 10 should provide vibration data for machinery running as low as 20 rpm exhibiting 5 mils peak-to-peak displacement amplitude and still be able to resolve high frequencies with acceleration amplitudes of 50 g's. This equates to a dynamic range of 130 dB.

To achieve the desired response at the low frequency end, the noise floor should be less than 100 $\mu$g's at 1 Hz. This restricts the minimum size of the piezoelectric sensing element and seismic mass within the sensor. To achieve a 50 g response in the sensor at the high frequency end, the gain in the conditioning circuitry 20 should be limited such that the maximum sensitivity of the sensor output is no greater than 125 mV/g.

To achieve a 10 KHz bandwidth (within 3 dB) in the vertical direction, limitations are placed on sensor mass, stiffness, hold down force, and electronic filtering by conditioning circuitry 20. For example, to meet the 10 KHz bandwidth parameter, the sensor resonant frequency should be as high as possible. Resonant frequency is proportional to the square root of stiffness/mass. For the sensor response to be with 3 dB at 10 KHz and less than 15 dB at resonance requires 2-pole, low-pass filtering with parameters set to assure the desired response at 10 KHz and at resonance.

Since the resonant frequency and total mass of the sensor 10 are known and constant, the parameters of the conditioning circuitry 20 can be permanently set for optimization of the sensor's frequency response in any application. If the sensor 10 is to be used in conjunction with a mounting pad as described below, the effect of the mounting pad can also be taken into account to achieve the desired sensor response.

While any filtering technique capable of appropriately reducing the electrical charge of the vibration sensor signal may be suitable for use in the invention, a preferred embodiment of the invention employs a two-pole, low-pass filter 30a–c. The parameters of the two-pole, low-pass filter are selected to provide a bandwidth of 10 KHz for the vertical direction (Z direction) within 3 dB and less than 15 dB increase for all three sensor modules 16a–c at the mounted sensor resonance frequency. For each axis, the output of the filter 30a–c is received by a converter 32a–c which converts the filtered sensor signal from an electrical charge to a corresponding voltage for use by a peripheral device.

As described above, the sensor 10 is preferably magnetically attached to a mounting surface that transmits vibration produced by the machine. Providing the sensor 10 with magnetic attachment means enables the sensor 10 to be easily attached and removed when data collection is complete. To provide a sufficient hold down force, a strong magnet, such as a NdFeB rare earth magnet, is used.

In one embodiment, the machine's outer casing, which is typically fabricated from a magnetically attractable material, is used as the mounting surface to which the sensor module is attached. The feet 22a, 22b are configured as elongate, substantially parallel rails to provide a stable 2-line contact with the mounting surface. The feet 22a, 22b, which preferably have a minimum of surface area in contact with the mounting surface, can also be used as an index to facilitate proper orientation of the sensor module 10 to the machine. It is believed, however, that attaching the sensor 10 directly to the machine's outer casing may compromise sensor response relative to other attachment methods.

Figure 4:
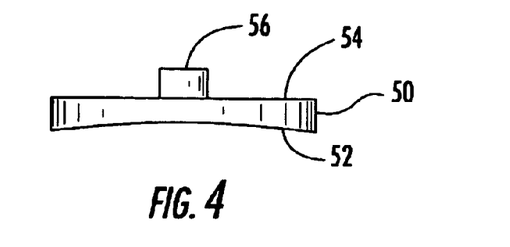
FIG. 4 is a side view of a keyed mounting pad to facilitate mounting of the sensor in accordance with the invention.
Figure 5:
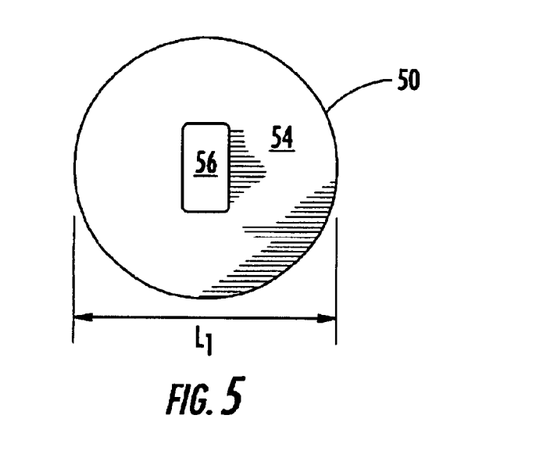
FIG. 5 is a top view of the keyed mounting pad of FIG. 4.

In a more preferred embodiment, a keyed mounting pad is employed to serve as the mounting surface. A preferred embodiment of such a mounting pad as shown in FIGS. 4 and 5 includes a lower surface 52 which is attached directly to the machine by any suitable means of attachment including welding, adhesives, bolts, or other fastening means. The lower surface 52 of the mounting pad 50 is preferably contoured to match the contour of the machine surface to which the mounting pad 50 is attached. The upper surface 54 of the mounting pad 50 is preferably substantially flat and functions as the mounting surface to which the sensor module 10 is magnetically attached. Accordingly, at least the upper surface 54, and preferably the entire mounting pad 50, is fabricated from a magnetically attractable material.

Figure 6:
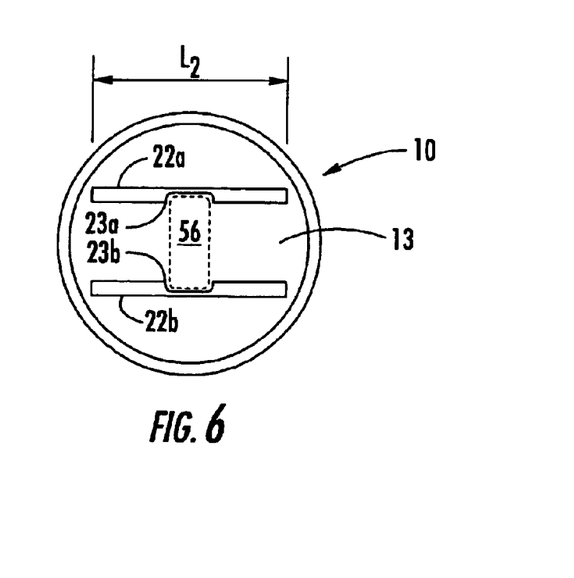
FIG. 6 is a bottom view of an integral magnet vibration sensor with feet keyed for mounting the sensor to the mounting pad of FIGS. 4 and 5.

The mounting pad 50 and sensor 10 are preferably keyed to one another to facilitate proper orientation of the sensor 10 and its internal vibration sensing element(s) 16. In this regard, a key 56 is provided on the mounting pad upper surface 54 in the form of a rectangular-shaped post. The key 56 is geometrically configured and sized to be received within corresponding notches 23a, 23b formed along the lower portions of feet 22a, 22b as shown in FIG. 6 by superimposing the key 56 (broken lines) within the notches 23a, 23b. To enhance stiffness between the sensor 10 and mounting pad 50, the length L1 of the mounting pad upper surface 54 is preferably at least as great as the length L2 of the lower portions of the feet 22a, 22b which establish contact with the mounting pad upper surface 54.

Although a specific configuration of a key 56 for the mounting pad 50 and sensor 10 is illustrated in FIGS. 4–6, it will be understood that the key 56 and the corresponding sensor structure may be of any suitable configuration that facilitates proper orientation and alignment of the sensor 10 with the machine.

Figure 3:
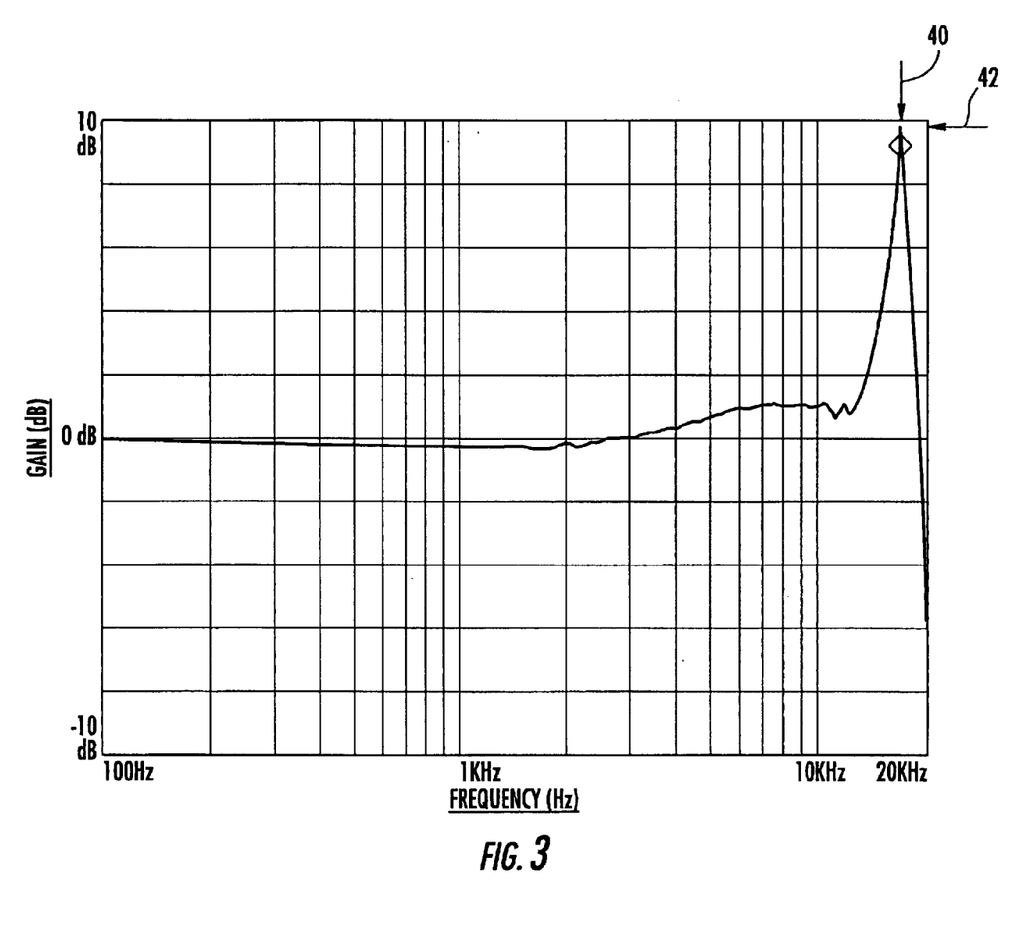
FIG. 3 is a graph showing the frequency response of an integral magnet vibration sensor in a direction perpendicular to the plane comprising the feet of the sensor.

FIG. 3 graphically illustrates the observed frequency response of an integral magnet accelerometer sensor magnetically mounted to the machine's outer casing and oriented to sense machine vibration along the radial axis in accordance with the invention where signal gain is given along the vertical (left) axis in increments of 2 dB per division and frequency in Hertz is given along the horizontal (bottom) axis. The accelerometer sensor had a weight of about 125 grams. The conditioning circuit parameters included a two-pole, low-pass filter with a 3 dB point at about 10 KHz. The charge converter parameters were such that the output of the sensor was 100 mV/g.

As shown in FIG. 3, the resonant frequency (indicated at arrow 40) was found to be approximately 16.84 kHz and the gain at resonance (indicated at arrow 42) was approximately 9.28 dB. Signal gain approached +3 dB at about 15 kHz. These measurements represent significant improvement over other non-permanently attached vibration sensors employing 2-rail magnets (i.e., magnets having two lines of contact).

As described above, a preferred embodiment of a multi-axis vibration sensor with integral magnet includes an integral tri-axial sensor with integral magnet having parallel rail feet sufficiently separated to provide a "two-line" contact on a curved surface and keyed for placement on a substantially flat mounting pad to assure proper orientation of the sensor 10. Sensor output conditioning circuitry includes two-pole, low-pass filtering designed to provide a bandwidth of 10 KHz for the Z direction sensor with 3 dB and less than 15 dB increase for all three sensor modules 16a–c at the mounted sensor resonance frequency, a noise floor less than 100 µg's at 1 Hz, a sensitivity less than 125 mV/g, and a dynamic range of 130 dB. The sensor 10 is further configured to provide a bandwidth of 10 kHz within 3 dB in the vertical Z direction, a bandwidth in the X-Y directions of 4 kHz within 3 dB, and provides a sensor response for the mounted sensor of less than 15 dB at sensor resonance. The sensor 10 is preferably mounted and removed on a substantially flat mounting surface (typically use a mounting pad with flat upper surface attached to the machine outer casing) that is keyed for proper sensor orientation. Finally, the sensor 10 is preferably used in conjunction with a multi-axis data collector so that acceptable data can be acquired in less total time.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A vibration sensing apparatus for being placed in sensory contact with a machine, the apparatus having a resonant frequency, said apparatus comprising:
   a housing having a first end and a second end;
   a magnet disposed within said housing adjacent the first end and rigidly affixed thereto for magnetically attaching the apparatus in a desired orientation to a mounting surface that transmits machine vibration;
   a multi-axis vibration sensor disposed within said housing integral with the magnet for sensing vibration produced by the machine along a plurality of machine axes and producing a plurality of sensor signals in the form of an electrical charge corresponding to sensed vibration;
   conditioning circuitry for conditioning the sensor signals and producing conditioned sensor signals, said conditioning circuitry including:
      a filter for receiving the sensor signals and attenuating the sensor signals at the resonant frequency of the apparatus, producing filtered sensor signals in the form of an electrical charge; and
      a converter for converting the filtered sensor signals to an electrical signal for use by a peripheral device.

2. The apparatus of claim 1, further comprising a communication link adjacent the second end of the housing for outputting the conditioned sensor signals to the peripheral device.

3. The apparatus of claim 1, further comprising a plurality of feet rigidly attached to the first end of said housing for contacting said mounting surface when the apparatus is placed in sensory contact with the machine.

4. The apparatus of claim 3 wherein each of said plurality of feet are elongate and substantially parallel to one another.

5. The apparatus of claim 3 wherein said mounting surface includes a mounting pad having a lower surface attached to the machine and a magnetically attractable, substantially flat upper surface for receiving the vibration sensing apparatus, said mounting pad and said plurality of feet being keyed to facilitate proper orientation of the apparatus when received by the mounting pad.

6. The apparatus of claim 1 wherein said mounting surface includes an outer surface of the machine.

7. The apparatus of claim 1 wherein said filter is a two-pole, low-pass filter.

8. The apparatus of claim 7 wherein said filter is configured to provide a sensor bandwidth in the axial and radial direction of 4 kHz within 3 dB.

9. The apparatus of claim 7 wherein said filter is configured to provide a sensor bandwidth of 10 kHz within 3 dB for the vertical direction and a less than 15 dB increase for all sensor axes at the resonant frequency of the sensing apparatus when mounted in sensory contact with a machine.

10. The apparatus of claim 1 wherein said multi-axis vibration sensor is a tri-axial sensor.

11. The apparatus of claim 1 wherein said magnet is fabricated from neodymium.

12. The apparatus of claim 1 wherein said desired orientation includes positioning a first axis of said multi-axis sensor to sense machine vibration in a direction normal to an outer surface of the machine.

13. The apparatus of claim 12 wherein said desired orientation includes positioning a second axis of said multi-axis sensor to sense machine vibration in a plane tangent to said outer surface of the machine.

14. The apparatus of claim 13 wherein said desired orientation includes positioning a third axis of said multi-axis sensor to sense machine vibration in a direction parallel to a rotating shaft of the machine.

15. A vibration sensing apparatus for being placed in sensory contact with a machine, the apparatus having a resonant frequency, said apparatus comprising:
   a housing having a first end and a second end;
   a magnet disposed within said housing adjacent the first end and rigidly affixed thereto for magnetically attaching the apparatus in a desired orientation to a surface and for transmitting machine vibration;
   a multi-axis vibration sensor disposed within said housing adjacent said magnet for sensing vibration produced by the machine along a plurality of machine axes and producing a plurality of sensor signals corresponding to sensed vibration, said multi-axis vibration sensor being in rigid relation to said magnet; and
   a plurality of feet rigidly attached to the first end of said housing for contacting said surface when the apparatus is placed in sensory contact with the machine.

16. The apparatus of claim 15 wherein said plurality of feet are substantially parallel to one another.

17. The apparatus of claim 15 further comprising a conditioning circuit disposed within said housing for conditioning the sensor signals, producing conditioned sensor signals.

18. The apparatus of claim 17 further comprising a communication link adjacent the second end of the housing for outputting the conditioned sensor signals to a peripheral device.

19. The apparatus of claim 17 wherein each of said plurality of sensor signals is in the form of an electrical charge and said conditioning circuit includes:
   a filter for receiving the sensor signals and attenuating the sensor signals at the resonant frequency of the apparatus, producing filtered sensor signals in the form of an electrical charge; and
   a converter for converting the filtered sensor signals from an electrical charge to an electrical voltage for use by the peripheral device.

20. The apparatus of claim 19 wherein said filter is a two-pole, low-pass filter.

21. The apparatus of claim 20 wherein said filter is configured to provide a sensor bandwidth in the axial and radial direction of 4 kHz within 3 dB.

22. The apparatus of claim 20 wherein said filter is configured to provide a sensor bandwidth of 10 kHz within 3 dB for the vertical direction and a less than 15 dB increase for all sensor axes at the resonant frequency of the sensing apparatus when mounted in sensory contact with a machine.

23. The apparatus of claim 15 wherein said vibration sensor is tri-axial sensor.

24. The apparatus of claim 15 further comprising a mounting surface formed on an outer surface of the machine.

25. The apparatus of claim 15 further comprising a mounting pad having a lower surface attached to the machine and a magnetically attractable upper surface for receiving the vibration sensing apparatus, said mounting pad being configured to facilitate proper orientation of the apparatus when received by the mounting pad.

26. The apparatus of claim 15 wherein said desired orientation includes positioning a first axis of said multi-axis sensor to sense machine vibration in a direction normal to an outer surface of the machine.

27. The apparatus of claim 15 wherein said desired orientation includes positioning a second axis of said multi-axis sensor to sense machine vibration in a plane tangent to said outer surface of the machine.

28. The apparatus of claim 15 wherein said desired orientation includes positioning a third axis of said multi-axis sensor to sense machine vibration in a direction parallel to a rotating shaft of the machine.

29. A vibration sensing apparatus for being placed in sensory contact with a machine, the apparatus having a resonant frequency, said apparatus comprising:
   a magnet assembly for magnetically attaching the apparatus to a mounting surface that transmits machine vibration; and
   a multi-axis vibration sensor supported on the machine by the magnet assembly for sensing vibration produced by the machine along a plurality of machine axes and producing a plurality of sensor signals corresponding to sensed vibration, the magnet assembly and multi-axis vibration sensor being oriented and configured to produce said plurality of sensor signals including radial and axial sensor signals with each having substantially linear response ranges where the sensor signal varies by no more than about ±3 dB over a bandwidth of frequencies greater than or equal to about 5 KHz and a vertical axis sensor signal having a substantially linear response range where the sensor signal varies by no more than about ±3 dB over a bandwidth of frequencies greater than or equal to about 10 KHz, said multi-axis vibration sensor being in rigid relation to said magnet assembly and electrically isolated therefrom.

30. The apparatus of claim 29, further comprising:
   a housing for at least partially enclosing the apparatus;
   a conditioning circuit disposed within said housing for conditioning the sensor signals, producing conditioned sensor signals; and
   a communication link adjacent the second end of the housing for outputting the conditioned sensor signals to a peripheral device.

31. The apparatus of claim 29 wherein said response at the resonant frequency is no more than 15 dB relative to the vibration sensor response in said substantially linear response range.

32. A vibration sensing apparatus for being placed in sensory contact with a machine, the apparatus having a resonant frequency, said apparatus comprising:
   a housing having a first end and a second end;
   a magnet disposed within said housing adjacent the first end and rigidly affixed thereto for magnetically attaching the apparatus to a mounting surface that transmits machine vibration;
   a multi-axis vibration sensor disposed within said housing for sensing vibration produced by the machine along a plurality of machine axes and producing a plurality of sensor signals corresponding to sensed vibration, each of said sensor signals having a substantially linear response range, said multi-axis vibration sensor being in rigid relation to said magnet;
   a conditioning circuit associated with said housing for attenuating the sensor signals at resonance to a level of no more than 15 db relative to the vibration sensor response in said substantially linear response range, producing attenuated sensor signals; and
   a communication link adjacent the second end of the housing for outputting the attenuated sensor signals to a peripheral device.

33. A vibration sensing apparatus for being placed in sensory contact with a machine, the apparatus having a resonant frequency, said apparatus comprising:

a housing having a first end and a second end;

a magnet disposed within said housing adjacent the first end and rigidly affixed thereto for magnetically attaching the apparatus in a desired orientation to a mounting surface that transmits machine vibration;

a multi-axis vibration sensor disposed within said housing integral with the magnet for sensing vibration produced by the machine along a plurality of machine axes and producing a plurality of sensor signals in the form of an electrical charge corresponding to sensed vibration;

conditioning circuitry for conditioning the sensor signals and producing conditioned sensor signals, said conditioning circuitry including:

a filter for receiving the sensor signals and attenuating the sensor signals at the resonant frequency of the apparatus, producing filtered sensor signals in the form of an electrical charge; and     a converter for converting the filtered sensor signals to an electrical signal for use by a peripheral device;

a communication link adjacent the second end of the housing for outputting the conditioned sensor signals to the peripheral device; and a plurality of elongate and substantially parallel feet rigidly attached to the first end of said housing for contacting said mounting surface when the apparatus is placed in sensory contact with the machine.

* * * * *